No. 698,200. Patented Apr. 22, 1902.
J. L. HINDS.
VOLT METER SWITCH.
(Application filed Jan. 11, 1902.)
(No Model.)
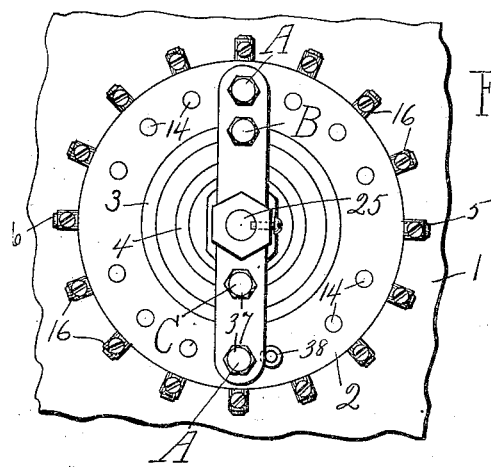
Fig. I.
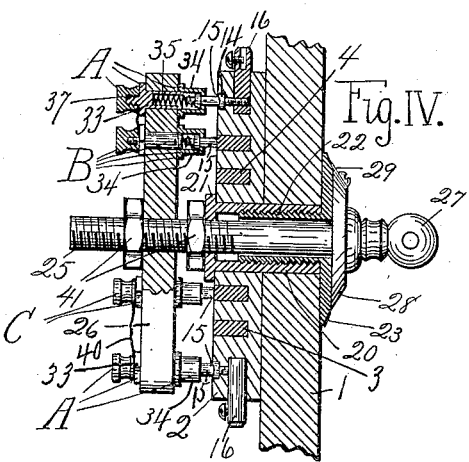
Fig. IV.
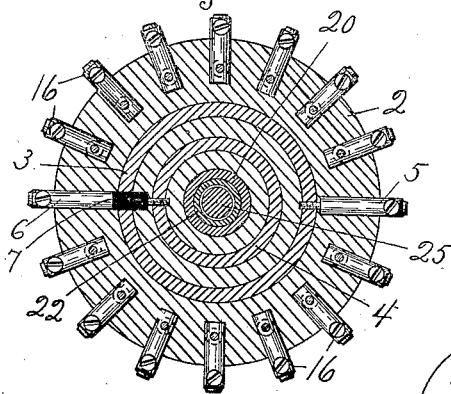
Fig. III.
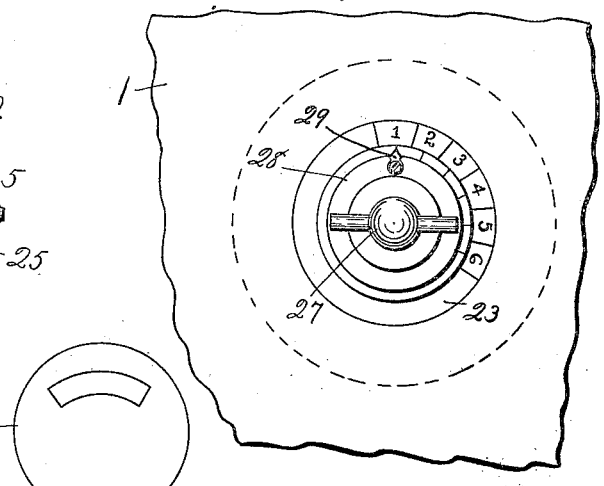
Fig. II.
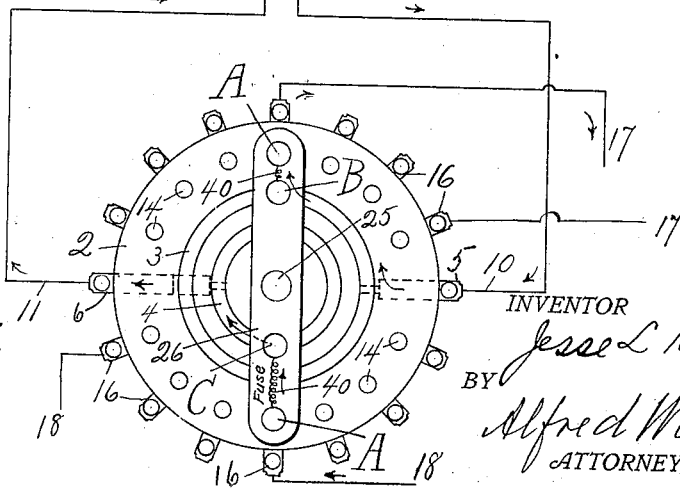
Fig. V.
WITNESSES:
C. C. Schorneck
A. E. Friend
INVENTOR
Jesse L. Hinds
BY Alfred Wilkinson
ATTORNEY.
THE NORRIS PETERS CO., PHOTO-LITHO., WASHINGTON, D. C.

UNITED STATES PATENT OFFICE.

JESSE L. HINDS, OF SYRACUSE, NEW YORK.

VOLTMETER-SWITCH.

SPECIFICATION forming part of Letters Patent No. 698,200, dated April 22, 1902.

Application filed January 11, 1902. Serial No. 89,293. (No model.)

*To all whom it may concern:*

Be it known that I, JESSE L. HINDS, of Syracuse, in the county of Onondaga, in the State of New York, have invented new and useful Improvements in Voltmeter-Switches, of which the following, taken in connection with the accompanying drawings, is a full, clear, and exact description.

My invention relates to a switch for voltmeters to be set permanently in position on a switchboard or in other suitable situation, to which a number of line-circuits may be connected and easily tested. Its essential features are an insulating-base having suitable means to secure it in position, two concentric metallic rings in one face thereof, to which are connected binding-posts adapted, respectively, for the wires of the opposite poles of the voltmeter. On the same face of the base are arranged in a circle a series of insulated metallic contact-terminals provided with binding-posts forming a series of opposite pairs of terminals, to which the opposite line-wires of the circuits are connected. On the base is journaled an insulated switch-arm carrying four plunger-contacts, two of which are adapted to be in constant connection, respectively, with the opposite poles of the voltmeter. The other two are adapted to make contact with the opposite contact-terminals as the arm is turned. These plunger-contacts are connected in pairs by a fuse or other suitable means, each pair being composed of the two plunger-contacts arranged on each end of the arm, one of each pair adapted to make contact with the voltmeter-pole and the other with the corresponding contact terminal or pole of the line-circuit. The arm and all of these metallic parts may be arranged conveniently on the back of the base and on the front a handle to turn the switch-arm and a dial and pointer to indicate the line to be tested.

My invention will be understood by reference to the drawings herewith, in which the reference-letters of the specification are used to indicate the same parts in all the figures.

Figure I is a rear elevation of my switch. Fig. II is a front elevation. Fig. III is a section taken parallel to the elevation. Fig. IV is a vertical cross-section at right angles to Fig. III. Fig. V is a diagram showing the circuit of the line to be tested through the voltmeter.

In the figures, 1 indicates a portion of the switchboard on which my switch is secured; 2, the base thereof, made of any suitable insulating material and preferably a disk.

3 4 are concentric insulated metallic rings let into the rear face of the base and preferably lying flush with its surface and forming terminals for the voltmeter.

5 6 are a pair of binding-posts connected to the respective rings, 5 being connected to ring 3, as here shown, and 6 to ring 4 and provided with insulated bushing 7 to insulate it from ring 3. 10 11 are wires from these respective binding-posts to the voltmeter 12. These binding-posts may be arranged opposite, as here shown, or in any other convenient manner.

An annular series of contact-terminals 14 14 are arranged flush with the rear surface of the base and are provided each with a binding-post 16, arranged, as here shown, extending from the edge of the disk or in any other convenient way. The diametrically opposite terminals of this series form pairs to which are connected the opposite wires 17 18 of the respective line-circuits to be tested.

The base is secured in position on the switchboard by a sleeve 20, having the shoulder 21 to engage with the base, and by the threaded tubular shank 22 engaging with the sleeve and carrying on its outer end the dial 23 spaced and numbered corresponding to the line-circuits to be tested. Through the shank and sleeve extends a shaft 25, carrying on its inner threaded end the switch-arm 26 and nuts 41 to retain it in position and on its outer the handle 27, the plate 28, and pointer 29, to be turned to the number on the dial to indicate the line to be tested. On each end of the arm are arranged a pair of plunger-contacts connected, preferably, by a fuse 40, one of each pair corresponding to the voltmeter-terminal and the other to the line-wire terminal. The line-wire plunger contacts, making contact as the arm is turned with circuit-terminals 14 14, are indicated by A A, and the voltmeter-contacts, respectively, by B, adapted to make contact with ring 3 and by C with ring 4. These plunger-contacts consist of shells 33 and 34, threaded to engage, and forming between them a pocket in which is arranged spring 35, bearing on small plunger whose tip 15 extends outwardly through hole in lower shell 34 to make firm contact with a ring or a contact-terminal, as may be.

37 represents screw-caps fitted to shells 33 to retain the fuse in place.

38 is a stop to limit movement of the arm.

My switch is simple and economical to make and install, and its convenience is obvious, its object being to permit the use of one voltmeter for testing several lines. Instead of using several voltmeters, or connecting and disconnecting the different lines to be tested, all the lines may be permanently connected to the switch and tested in turn simply by turning the switch to make contact with the contact-terminals of the particular line when the circuit is formed as follows: Line-wire 17 in, binding-post 16, contact-terminal 14, tip 15 of plunger-contact A, fuse 40, plunger-contact B, ring 3, binding-post 5, wire 10, voltmeter-wire 11, binding-post 6, ring 4, plunger-contact C, fuse 40, plunger-contact A, terminal 14, binding-post, wire 18 out.

What I claim, and desire to secure by Letters Patent of the United States, is—

1. In a voltmeter-switch, the combination with an insulating-base, of a series of contact-terminals arranged thereon in pairs to be connected to the respective lines to be tested, a pair of terminals adapted to be connected to the opposite poles of the voltmeter, an insulating member movably supported on the base, contacts arranged on said member in pairs, connections between the two contacts of each pair, one of each pair being adapted to remain continuously in contact with one voltmeter-terminal, the other adapted to make connection successively with the line-terminals as the insulating member is moved over the base.

2. In a voltmeter-switch, the combination with an insulating-base, of a series of contact-terminals arranged thereon in pairs to be connected to the respective lines to be tested, a pair of terminals adapted to be connected to the opposite poles of the voltmeter, an insulating member journaled on the base, contacts arranged on said member in pairs, connections between the two contacts of each pair, one of each pair being adapted to remain continuously in contact with one voltmeter-terminal, the other adapted to make connection successively with the line-terminals as the insulating member is rotated.

3. In a voltmeter-switch, the combination with a base of insulating material, of two metallic rings thereon adapted to be connected to the opposite poles of the voltmeter, an annular series of terminals thereon arranged in pairs to be connected to the respective lines to be tested, an insulating member journaled on the base, contacts arranged on said member in pairs, and connections between the two contacts of each pair, one of each pair being adapted to remain continuously in contact with one ring, the other adapted to make connection successively with the line-terminals as the insulating member is rotated.

4. In a voltmeter-switch, the combination with a base of insulating material, of two metallic rings arranged concentrically on the rear surface of the base, an annular series of contact-terminals on the base arranged in pairs around the rings, binding-posts connected to said terminals for the attachment of the line-wires, two binding-posts connected to the respective rings for the voltmeter-wires, an insulating-arm journaled on said base concentrically with the rings, a handle to turn the arm, contact-shells, forming plunger-contacts, arranged in pairs on the ends of said arm, connections between the plunger-contacts of each pair, plungers arranged in said shells and having tips extending outwardly through holes in their base, and springs arranged in said shells and bearing on the plungers to maintain the tips in contact with the contact-terminals on the base, the outer tips of each pair being adapted to make contact with the contact-terminals of the respective lines as the arm is turned and the inner tips on each arm being adapted to remain in permanent contact, one with the inner ring, the other with the outer.

5. In a voltmeter-switch, the combination with a base of insulating material, of two metallic rings of different sizes arranged concentrically on the rear surface of the base, two binding-posts connected to the respective rings to receive the wires from the opposite poles of the voltmeter, an annular series of contact-terminals on the base, arranged in pairs around the rings, binding-posts for said contact-terminals to receive the opposite wires of the lines to be tested, an insulating member journaled on the base, contacts arranged on said member in pairs and connections between the two contacts of each pair, one of each pair being adapted to remain continuously in contact with one voltmeter-pole, the other adapted to make connection successively with the line-terminals as the insulating member is rotated.

6. In a voltmeter-switch, a base of insulating material, a series of metallic contact-terminals arranged in a ring on the rear face of the base, binding-posts connected to the respective contact-terminals for the line-wires, said terminals and binding-posts being arranged diametrically opposite in pairs, two metallic rings or voltmeter-terminals let into the rear face of the base, flush therewith and arranged concentrically within the ring of contact-terminals, one ring within the other, binding-posts for the voltmeter-wires connected one with each ring, an internally-threaded sleeve having an integral shoulder to engage with the disk, a tubular shank engaging with the sleeve, a dial on the outer end of the shank inscribed with the numbers corresponding to the lines to be tested, a shaft having a threaded inner end extending through said sleeve and shank, a handle on the outer end of the shaft, a pointer on the handle, to indicate numbers on the dial, a rotating arm of insulating material fitted to the inner end of said shaft, four plunger-contacts carried on said arm and arranged in pairs, one pair adjacent to each end of the arm, the contacts of each pair being connected by a fuse and one of each pair adapted to remain in continuous connection with one voltmeter-pole, the other adapted to make connections with the line-terminals as the arm is rotated.

7. In a voltmeter-switch, a disk-shaped base of insulating material, a series of metallic contact-terminals arranged in a ring on the rear face of the base and lying flush therewith, binding-posts connected to said respective contact-points and extending outwardly around the edge of the disk for the line-wires, said terminals and binding-posts being arranged diametrically opposite in pairs and being equal in number to the lines to be tested, two metallic rings or voltmeter-terminals let into the rear face of the base and lying flush therewith and arranged concentrically within the ring of contact-terminals, one ring within the other, binding-posts on the edge of the disk for the voltmeter-wires connected one with each ring, an internally-threaded sleeve having an integral shoulder to engage with the disk, a tubular shank engaging with the sleeve, a dial on the outer end of the shank inscribed with numbers on its outer face corresponding to the lines to be tested, said sleeve and shank extending through the switchboard, a shaft having a threaded inner end extending through said sleeve and shank, an integral plate and handle on the outer end of the shaft, a pointer on the plate, nuts on the inner end of the shaft to secure the parts adjustably in position, a rotating arm of insulating material fitted to the inner end of said shaft and secured thereon by one of the nuts, four plunger-contacts carried on said arm and arranged in pairs, one pair adjacent to each end of the arm, the contacts of each pair being connected by a fuse and one of each pair adapted to remain in continuous connection with one voltmeter-pole, the other adapted to make connections with the line-terminals as the arm is rotated.

8. In a voltmeter-switch, a disk-shaped base of insulating material, a series of metallic contact-terminals arranged in a ring on the rear face of the base and lying flush therewith, binding-posts connected to the respective contact-terminals and extending outwardly around the edge of the disk for the line-wires, said terminals and binding-posts being arranged diametrically opposite in pairs and being equal in number to the lines to be tested, two metallic rings or voltmeter-terminals arranged on the rear face of the base, and concentrically within the circle of contact-terminals, one ring within the other, binding-posts on the edge of the disk for the voltmeter-wires connected one with each ring, an internally-threaded sleeve having an integral shoulder to engage with the disk, a tubular shank engaging with the sleeve, a dial on the outer end of the shank inscribed with numbers on its outer face corresponding to the lines to be tested, a shaft having a threaded inner end extending through said sleeve and shank, an integral plate and handle on the outer end of the shaft, a pointer on the plate, nuts on the inner end of the shaft to secure the parts adjustably in position, a rotating arm of insulating material fitted to the inner end of said shaft and secured thereon by the nut or nuts, four plunger-contacts carried on said arm and arranged in pairs, one pair adjacent to each end of the arm, the contacts of each pair being connected by a fuse and one of each pair adapted to remain in continuous connection with one ring, the other adapted to make connections with the line-terminals as the arm is rotated, said plunger-contacts being composed each of two shells engaging with each other and arranged to extend through the arm forming a pocket, of a plunger arranged in said pocket with its contact-tip extending outwardly through a hole in the bottom of one shell and of a spring engaging with the plunger to force the tip outwardly against the terminals substantially as described and shown.

In testimony whereof I have hereunto signed my name.

JESSE L. HINDS. [L. S.]

Witnesses:
SAMUEL B. VAN RAUST,
C. C. SCHOENECK.